United States Patent

[11] 3,633,415

[72] Inventor  John W. Luce
              Arnold, Md.
[21] Appl. No. 811,359
[22] Filed     Mar. 28, 1969
[45] Patented  Jan. 11, 1972
[73] Assignee  Westinghouse Electric Corporation
               Pittsburgh, Pa.

[54] FLOWMETER
     8 Claims, 5 Drawing Figs.

[52] U.S. Cl. .................................................... 73/189,
                                                                73/194 A
[51] Int. Cl. ........................................................ G01p 5/00,
                                                                  G01w 1/02
[50] Field of Search ............................................. 73/170,
         188, 189, 194 A, 194 EM; 181/0.5, 26; 340/3, 5

[56]                References Cited
              UNITED STATES PATENTS
2,407,330  9/1946  Turner .......................... 181/26
2,928,277  3/1960  Cavanagh ..................... 73/189 X
3,110,876  11/1963 Ramey .......................... 73/194 X
3,161,047  12/1964 Griswold ....................... 73/194 X
3,379,060  4/1968  Pear ............................. 73/189
3,435,677  4/1969  Gardner ....................... 73/189

FOREIGN PATENTS
140,249  10/1960  U.S.S.R. ....................... 73/189

Primary Examiner—Richard C. Queisser
Assistant Examiner—C. E. Snee, III
Attorneys—F. H. Henson, E. P. Klipfel and D. Schron ABSTRACT: A flowmeter measures fluid speed and flow direction in a plane. The flowmeter includes three transducer stations each of which projects acoustic energy towards the other two upon the simultaneous application of a drive signal. Each transducer station provides an output signal in response to the acoustic energy received from a corresponding other transducer station and the respective output signals, which occur at times depending upon the fluid flow, are utilized to obtain the time difference of travel of acoustic energy between the transducer stations to provide a plurality of difference signals. The difference signals are also applied to three stator windings of a synchro in order to obtain a vector direction, by virtue of the response of the rotor of the synchro. Computing means are additionally provided for computing the magnitude velocity of the fluid flow under measurement. In another embodiment speed and direction of fluid flow is obtained by electromagnetic means including three spaced-apart electrical contact pick-ups.

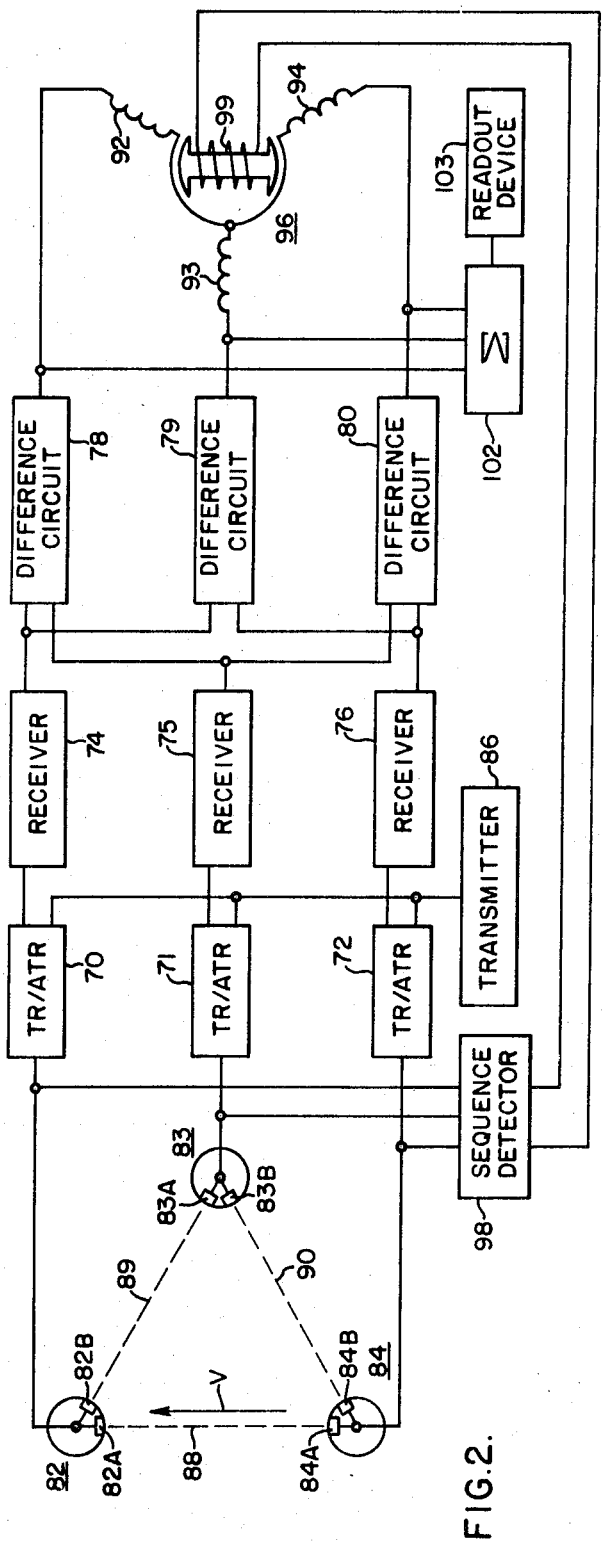
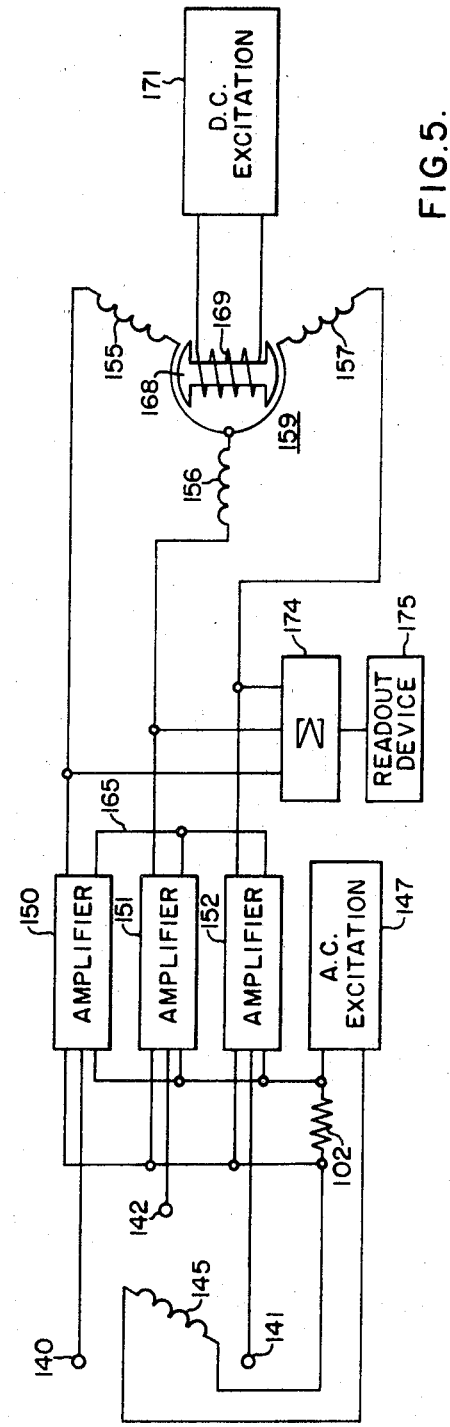
FIG. 2.
FIG. 5.

FLOWMETER

BACKGROUND OF THE INVENTION

1. Field of the Invention

This invention in general relates to flowmeters, and in particular to a flowmeter for measuring the flow of gases or liquids where the flow is generally in a plane but may be in any direction in that plane.

SUMMARY OF THE INVENTION

Three transducer stations are arranged in a triangular configuration for projection of acoustic energy toward one another along respective acoustic paths all lying in a common plane. Each transducer station is energized for propagating acoustic energy toward the other two transducer stations. Means are provided for obtaining an indication of the time difference of travel of acoustic energy between the stations for obtaining a plurality of difference signals and means are provided for vectorially combining the difference signals in order to obtain a resultant vector direction. The vector combination is accomplished by means of a synchro having three stator windings each for receiving a respective difference signal.

In an alternative arrangement an electromagnetic flowmeter is provided with three contact buttons for generation of three difference voltages for application to the stator windings of a synchro.

For highly directive, high-flow systems acoustic generating transducers are located in three transducer support posts constructed and arranged, in conjunction with the transducers, to eliminate various errors and simplify transducer placement.

BRIEF DESCRIPTION OF THE DRAWINGS

FIG. 2 illustrates a modification of the embodiment of FIG. 1;

FIG. 5 illustrates, in block diagram/schematic forms an electromagnetic version of the present invention.

DESCRIPTION OF THE PREFERRED EMBODIMENTS

Figure 1:
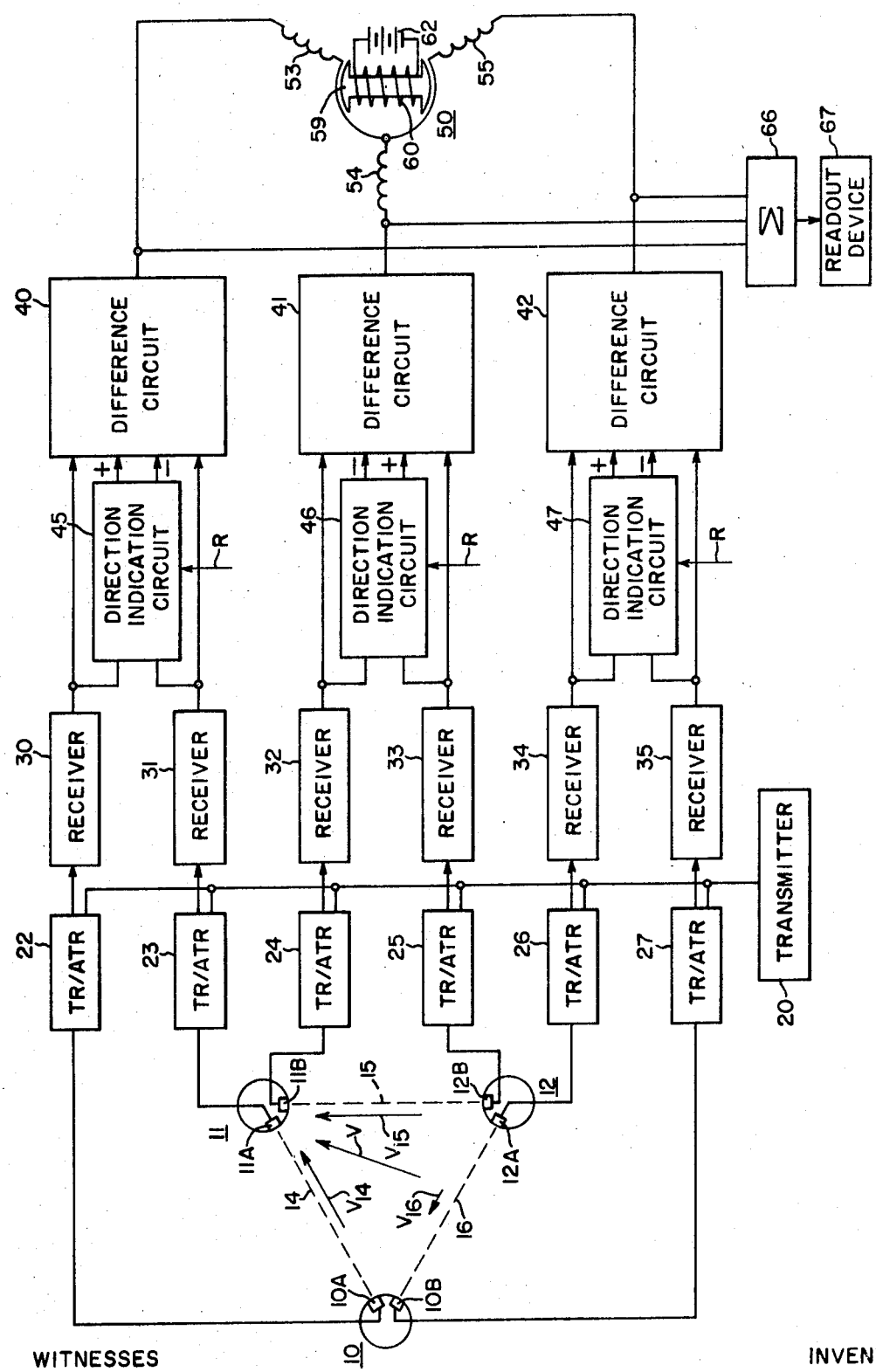
FIG. 1 illustrates, in block diagram/schematic form, one embodiment of the present invention.

Referring now to FIG. 1, there is illustrated a flowmeter which includes three transducer stations 10, 11 and 12 for propagation of acoustic energy towards one another through a fluid under measurement, along acoustic paths 14, 15 and 16. The transducer stations 10, 11 and 12 are arranged in a triangular configuration and are preferably situated at the three apexes of an equilateral triangle.

Each of the transducer stations 10, 11 and 12 include respective individual transducers 10A and 10B, 11A and 11B, and 12A and 12B, for propagation and reception of acoustic energy. Each of the individual transducers, which may be of a piezo-ceramic material such as a lead-zirconate-titanate composition, are constructed and arranged to provide a highly directional narrow beam acoustic signal. Transmitter means 20 provides an energizing signal simultaneously to each of the transducers through respective transmit/antitransmit (TR/ATR) switch means 22 to 27 such that when energized, transducer 10A transmits an acoustic signal along acoustic path 14 at the same time that transducer 11A transmits an acoustic signal along the same acoustic path 14. In a similar and simultaneous fashion transducers 10B and 12A provide acoustic signals along acoustic path 16 and transducers 11B and 12B provide acoustic signals along acoustic path 15. The energizing signal is provided at the commencement of repetitive transmission cycles during each of which an acoustic propagation takes place, measurements are made, and fluid flow indication is obtained.

With the transducer stations 10, 11, and 12 positioned for measurement of a fluid under test, one acoustic signal provided along each acoustic path will be aided by the velocity of the fluid while the other and oppositely directed acoustic signal along that path will be retarded by the fluid velocity. By way of example, if the fluid flow is in the direction of the arrow V with a velocity V it may be shown that the velocity V has a vector component along each of the acoustic paths 14, 15 and 16 with the respective velocity components being designated $V_{14}$, $V_{15}$, and $V_{16}$. Accordingly, the acoustic signal provided by transducer 10A will be aided by the velocity component $V_{14}$ and will reach the transducer 11A prior to the signal from 11A reaching transducer 10A since it is traveling against the velocity component $V_{14}$. Similarly, the acoustic signal from transducer 12B will reach transducer 11B before the signal from 11B reaches transducer 12B, and the transducer 10B receives the signal from transducer 12A due to the velocity component $V_{16}$, before the transducer 12A receives the signal from transducer 10B. The difference in arrival times of oppositely directed acoustic energy along respective acoustic paths is an indication of the velocity component along that respective path and accordingly means are provided for obtaining an indication of the time difference in travel of acoustic energy between transducer stations 10 and 11, 11 and 12, and 12 and 10, and with such information and knowing the path length of acoustic travel, not only may the velocity of the fluid be determined but an indication of fluid direction may be obtained.

Upon the receipt of acoustic energy, each transducer is operable to provide a signal which is detected by receiver means 30 for transducer 10A, receiver means 31 for transducer 11A, receiver means 32 for transducer 11B, receiver means 33 for transducer 12B, receiver means 34 for transducer 12A and receiver means 35 for transducer 10B.

For the determination of the difference in travel time of acoustic energy along acoustic path 14 there is provided a difference circuit 40 which is responsive to the output signals provided by receivers 30 and 31 in order to provide a first difference signal proportional to, or indicative of, the difference in travel time of acoustic energy between transducers 10A and 11A. The difference circuit 40 may, by way of example, include a time difference counter which is initiated when one of the receivers 30 or 31 first provides an output signal and is turned off when the other receiver next provides an output signal. The count in the time difference counter may then be converted to an analog voltage by circuits well known to those skilled in the art, to constitute the first difference signal. In a similar manner there is provided difference circuit 41 which is responsive to the outputs of receivers 32 and 33 in order to provide a second difference signal indicative of the time difference in travel of acoustic energy between transducers 11B and 12B. Difference circuit 42 is responsive to the output of receivers 34 and 35 in order to provide a third difference signal indicative of the time difference in travel of acoustic energy between transducers 10B and 12A.

For a specific flow direction, such as indicated by the arrow V, the time difference indication associated with each difference circuit 40, 41 or 42 will be of a certain magnitude. Since a time difference magnitude is being indicated, those particular same magnitudes will be present even if the flow direction were 180° reversed from the flow V. In order to resolve such ambiguity, there is provided a plurality of direction indication circuits 45, 46 and 47 for difference circuits 40, 41 and 42 respectively. The direction indication circuit 45 is responsive to the first output signal provided by either transducer 10A or 11A (as evidenced by the output signal of receiver means 30 or 31) to indicate to the difference circuit 40 whether the output thereof should be of a positive or negative polarity. The direction indication circuit 45 is electrically connected to receive the outputs of receivers 30 and 31 such that if receiver 30 first provides an output signal a positive indication signal will be provided to difference circuit 40 and the direction indication circuit 45 will thereafter be nonresponsive to a second received signal from receiver 31. In the example illustrated transducer 11A will provide an output signal before transducer 10A and therefore the receiver 31 first provides an output signal and the direction indication circuit will therefore provide a negative indication signal to the difference circuit 40.

The direction indication circuit 46 is responsive to a first received output signal from receiver 32 to provide a negative indication signal to difference circuit 41 or is responsive to a first received signal from receiver 33 to provide a positive indication signal to difference circuit 41. In the example illustrated, transducer 11B will provide an output signal before the transducer 12B and accordingly the first output signal provided by the receiver 32 causes the direction indication circuit 46 to provide a negative indication signal. The direction indication circuit 47 receives the output signals from receivers 34 and 35 to provide its positive or negative indication signal to the difference circuit 42, and in the example illustrated, transducer 10B will provide an output signal before the transducer 12A and accordingly a negative indication signal is provided by the direction indication circuit 47. An external control circuit (not shown) may provide respective reset signals R to the direction indication circuits prior to each transmission cycle.

In order to vectorially combine the first, second and third difference signals provided by difference circuits 40, 41 and 42 respectively, there is provided a synchro 50 which includes three stator windings 53, 54 and 55 in conjunction with a rotor 59 and rotor winding 60. In use, the rotor winding is suitably polarized by means of, for example, voltage source 62 and rotor 59 may be coupled to a suitable pointer means for direction indication. The first difference signal is applied to stator winding 53, the second difference signal is applied to stator winding 54 and the third difference signal is applied to stator winding 55 such that there is a resultant magnetic field which causes the rotor 59 to line up in a direction with said resultant, and which direction is identical to the fluid flow direction indicated by the arrow V.

For other flow directions, the velocity component along each of the acoustic paths 14, 15 and 16 will aid or retard the acoustic velocity travel time between opposed transducers to give specific difference signals which when applied to the stator windings of the synchro 50 will indicate flow direction. Flows perpendicular to an acoustic path, for example a flow perpendicular to acoustic path 15 and flowing towards transducer station 10 will cause transducers 11B and 12B to simultaneously provide an output signal since there is no velocity component along the acoustic path 15, such that the output signal provided by the difference circuit 41 will be zero. Since the velocity components along acoustic paths 14 and 16 will be equal with the stated direction, the difference circuit 40 will provide a positive voltage of a certain magnitude and the difference circuit 42 will provide a negative voltage of that same magnitude. The equal and opposite voltages applied to stator windings 53 and 55 and the zero voltage applied to stator winding 54 will cause a resultant magnetic field to line up the rotor 59 in a direction indicative of the actual fluid flow.

In some applications not only is it desirable to know the flow direction but it is also desired to know the velocity of the fluid flow and accordingly summation means 66 is operable to receive the first, second and third difference signals from the difference circuits 40, 41 and 42 with the resultant summation being directly proportional to the actual fluid velocity, which velocity may be portrayed on indication means 67 such as a meter or digital readout device.

In FIG. 2 there is illustrated a modification wherein only three TR/ATR switches 70, 71 and 72 and three receiver means 74, 75 and 76, are utilized to supply difference circuits 78, 79 and 80 with signals derived from the transducer stations 82, 83 and 84.

Transducer station 82 includes individual transducers 82A and 82B electrically connected together such that an output signal will be provided to the receiver means 74 when either one of the transducers 82A or 82B receives a respective acoustic signal. In a similar manner transducer station 83 includes individual transducers 83A and 83B connected together so that the energization of either one will provide an output signal to the receiver means 75. Completing the acoustic array is the transducer pair 84A and 84B arranged to provide an output signal to the receiver means 76 in response to the receipt of an acoustic signal. The transmitter means 86 simultaneously provides an energizing signal through the TR/ATR switches 70, 71 and 72 to all of the transducers for propagation of acoustic energy along acoustic paths 88, 89 and 90.

Each of the receivers 74, 75 and 76 is constructed and arranged to provide one and only one output signal during each transmission cycle. By way of example, receiver 74 will provide its output signal in response to an input signal derived from the transducer station 82. Since acoustic energy is being propagated toward transducer station 82 along acoustic paths 88 and 89 each of its transducers 82A and 82B will provide an output signal in response to the impinging acoustic energy, however, only the first transducer, 82A or 82B, to receive the acoustic energy will cause the receiver 74 to provide an output signal whereas the second received signal will have no effect on receiver 74. Receiver 75 will provide an output signal when the first of transducers 83A or 83B is energized but will be nonresponsive to the output signal provided when the other of the transducer pair receives an acoustic signal. Receiver 76 which can receive an output signal provided by transducer 84A or 84B will provide an output signal when the first of said latter transducers is energized.

Each of the difference circuits 78, 79 and 80 includes two inputs and each is operable in a manner that a first received input signal on one of the inputs initiates a time difference counter and a subsequent received signal on the other of its inputs turns off the time difference counter. In the embodiment of FIG. 2 the difference circuit 78 receives the outputs of receiver 74 and 75, difference circuit 79 receives the outputs from receiver 74 and 76, and difference circuit 80 receives the outputs from receivers 75 and 76.

By way of example, consider a situation wherein fluid flow is in the direction of the arrow V and is parallel to the acoustic path 88. After each of the transducers is energized by the output of the transmitter 86, acoustic energy travels in opposite directions along each of the acoustic paths 88, 89 and 90. The first transducer to receive an acoustic signal is transducer 82A which then provides an output signal causing receiver 74 to initiate the counting function of difference circuits 78 and 79. A next acoustic signal will be received at transducer 83B simultaneously with the reception of an acoustic signal at transducer 82B. The output signal provided by transducer 83B causes receiver 75 to turn off the difference counter in difference circuit 78 and initiate the counting function in the difference circuit 80. The acoustic signal received by transducer 82B has no effect on the system since the receiver 74, as was stated, functions during each transmission cycle to provide one and only one output signal regardless of the number of input signals received.

In point of time transducers 83A and 84B next receive an acoustic signal with the resulting output signal provided by transducer 84B causing the receiver 76 to terminate the counting in difference circuits 79 and 80. The acoustic signal received by transducer 83 has no effect since the receiver 75 has already provided its output signal; similarly the last signal in point of time to be received is that acoustic signal traveling against the velocity direction in acoustic path 88 which has no effect on the system since receiver 76 has provided its output signal. The counts in the difference circuits 78, 79 and 80 may then be converted to a suitable voltage constituting first, second and third difference signals which are applied to respective stator windings 92, 93 and 94 of synchro 96.

A direction indication means is provided in order to resolve 180° flow ambiguity, one such direction indication means which can perform this function is illustrated in FIG. 2 as the sequence detector 98 which can detect the occurrence, and the sequence of such occurrence, of the first output signals to be provided by the respective transducer stations 82, 83 and 84 to provide a proper polarity biasing voltage to the rotor 99 of the synchro 96.

In instances where it is desired to know the velocity of fluid flow, there is provided a summation circuit 102 which is responsive to the first, second and third difference signals provided by the difference circuits 78, 79 and 80 respectively, for providing a resultant output signal to the indicator means 103 for a visual presentation of the actual fluid flow velocity.

Figure 3:
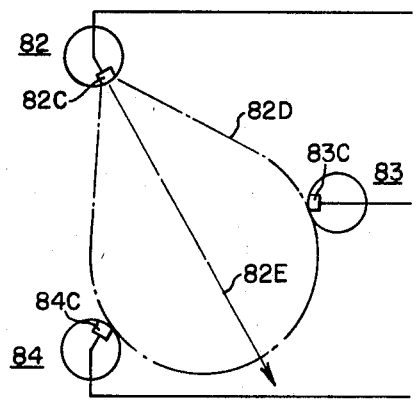
FIG. 3 illustrates a modified arrangement for the embodiment of FIG. 2.

In FIG. 3 there is illustrated a modification of the transducer arrangement whereby the three transducer stations 82, 83 and 84 require only a respective single transducer element 82C, 83C and 84C. Each of the transducers provides an acoustic signal with a beam width sufficient to energize both of the other two transducer elements. For clarity, only one such acoustic beam 82D is illustrated, and with the beam pattern sufficient to energize transducers 84C and 83C the acoustic beam axis 82E lies midway between transducers 83 and 84.

For the transducer arrangement as illustrated in FIGS. 1, 2 and 3, the transducers may be encapsulated in an acoustically transparent encapsulating material forming a transducer station. In another, and widely used form, the transducer elements may be set into a post with each post forming a transducer station and mounted on a base such as a submarine deck or current-monitoring station. In instances where relatively high-flow velocities are encountered and the flow direction is known to vary within small limits, for example a few degrees, an arrangement of transducer stations such as illustrated in FIG. 4 may be advantageously utilized.

Figure 4:
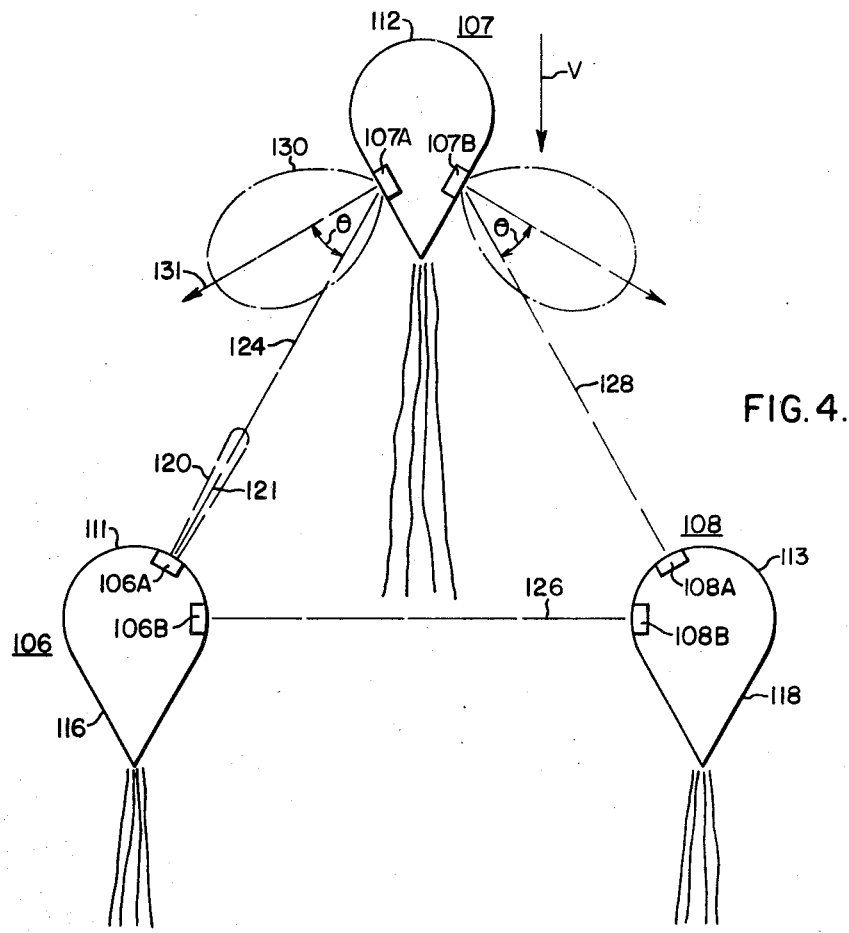
FIG. 4 illustrates, in plan view, an arrangement of transducer and transducer support posts for highly directive, high flow systems.

FIG. 4 illustrates, in cross-sectional plan view, three transducer stations 106, 107 and 108 inserted in a fluid which has a flow in the general direction of the arrow V. Each transducer station has an arcuate leading surface 111, 112 and 113 and a streamlined trailing rearward section 116, 117 and 118 for transducer stations 106, 107 and 108, respectively.

There are six transducer elements associated with the three transducer stations 106, 107 and 108. Four of the transducers 106A, 106B, 108A and 108B are all of the same type, in that each provides upon proper excitation a narrow acoustic beam. The acoustic beam pattern 120 for transducer 106A is illustrative. The narrow acoustic beam pattern is in the order of a few degrees or less and includes an acoustic beam axis 121 which lies along the acoustic path 124. The transducers 106B and 108B each provide a narrow beam acoustic signal having an acoustic beam axis which lies along the acoustic path 126, and transducer 108A provides a narrow beam having an acoustic beam axis which lies along the acoustic path 128. The transducers 107A and 107B are of the variety as illustrated in FIG. 3 in that each provides a relatively wide beam pattern such as 130 for transducer 107A. The acoustic beam axis 131 is at angle $\theta$ with respect to the acoustic path 124 however the width of the beam pattern is such that acoustic energy provided by the transducer 107A will impinge upon the transducer 106A and be detected thereby. Similarly, transducer 107B provides a wide beam pattern with the acoustic beam axis 133 being at an angle $\theta$ with respect to the acoustic path 128. With a wide beam pattern in the order of 60°, $\theta$ would be in the order of 30°.

Where the three transducer stations 106, 107 and 108 are located at each apex of an equilateral triangle, the beam width of the transducers 107A and 107B may be in the order of 60°. The choice of transducer beam patterns and placement of transducers allows measurements of acoustic travel time to be made while still maintaining streamlined shapes and in addition keeps the acoustic paths out of the wake 134 of post 107.

FIG. 5 illustrates a modification of the present invention wherein an electromagnetic flowmeter utilizes three pickup or contact buttons 140, 141 and 142. The operation of the electromagnetic version is such that when coil 145 is energized by a suitable source of excitation such as the AC excitation means 147 there is produced in the vicinity of the contact buttons 140, 141 and 142 a magnetic field. With immersion in a fluid under measurement, any fluid flow, and assuming the fluid is a conducting fluid, such as sea water, operates in a manner similar to a wirecutting magnetic flux lines such that there is a voltage produced at the contact buttons 140, 141 and 142 which voltages are dependent upon the magnitude and direction of the fluid flow. The voltages thus produced are detected and amplified in respective amplifiers 150, 151 and 152 the outputs of which are applied to the three stator windings 155, 156 and 157, respectively of synchro 159.

The excitation for the coil 145 could be a DC excitation, however difficulty is encountered with respect to electrolytic action resulting in polarization and accordingly an AC excitation is generally used. The signal at the contact buttons 140, 141 and 142 are AC signals with a voltage bias level that is dependent upon the fluid velocity and direction. In order that this voltage level be applied to the stator windings of the synchro 159, a portion of the AC excitation is sampled across the phase reference resistor 162 and is applied to each of the amplifiers 150, 151 and 152 to subtract the AC component of the input signal so that the outputs thereof are DC voltages referenced to a common amplifier connection 165.

The rotor 168 of the synchro is properly biased by means of rotor coil 169 which receives its excitation from a DC excitation source 171.

Summation and indicating means 174 and 175 are provided, as in the other embodiments, in order to give a visual indication of the velocity of the fluid flow.

Although the present invention has been described with a certain degree of particularity, it should be understood that the present disclosure has been made by way of example and that modifications and variations of the present invention are made possible in the light of the above teachings.

I claim as my invention:

1. A flowmeter for measuring planar fluid flow comprising:
    a. first, second and third transducer stations for projection of acoustic energy toward one another along respective acoustic paths;
    b. said transducer stations being angularly displaced from one another, with said acoustic paths being in a common plane;
    c. transmitter means;
    d. said transducer stations being collectively connected to said transmitter means;
    e. said transducer means being operable to simultaneously energize said transducer stations, during repetitive transmission cycles, for propagating acoustic energy from each transducer station to the other two, through a fluid under measurement;
    f. means for obtaining an indication of the time difference in travel of acoustic energy propagated
        1. from said first to said second transducer station and vice versa along a first of said acoustic paths,
        2. from said second to said third transducer station and vice versa along a second of said acoustic paths, and
        3. from said third to said first transducer station and vice versa along a third of said acoustic paths, to obtain first, second and third difference signals; and
    g. means for vectorily combining said difference signals to obtain a resultant vector direction.
2. Apparatus according to claim 1 wherein:
    a. each transducer station is located at a respective apex of an equilateral triangle.
3. Apparatus according to claim 1 which additionally includes
    a. means for summing the difference signals to obtain a value for magnitude of fluid flow velocity.
4. Apparatus according to claim 1 wherein:
    a. the means for vectorially combining the difference signals includes
        1. a synchro having
            i. first
            ii. second and
            iii. third stator windings and wherein 2. each difference signal is applied to a respective one of said stator windings.

5. Apparatus according to claim 1 which additionally includes
   a. means for resolving 180° flow ambiguities.

6. Apparatus according to claim 1 wherein:
   a. each transducer station includes
      1. first, and
      2. second transducers, each for transmitting an acoustic signal along respective acoustic paths and each being operable to provide an output signal upon receipt of an acoustic signal.

7. Apparatus according to claim 6 wherein:
   a. the means for obtaining an indication of the time difference in travel includes
      1. a plurality of receiver means, each connected to receive a respective transducer output, for providing a receiver output signal, and
      2. a plurality of time duration counter means each connected to receive the output signal from two said receiver means and operable to provide a difference signal the magnitude of which is governed by time occurrence of the output signals from said two receiver means.

8. Apparatus according to claim 6 wherein:
   a. the first and second transducers are electrically connected together forming a transducer pair; and wherein
   b. the means for obtaining an indication of the time difference in travel includes
      1. three receiver means each connected to receive one and only one output signal from a transducer pair during a transmission cycle, for providing a receiver output signal,
      2. three time duration counter means each connected to receive the output signal from a different pair of said receiver means and operable to provide a difference signal, the magnitude of which is governed by time occurrence of the output signals from said pair of receiver means.

* * * * *